3,066,026
WORT TREATMENT WITH CLAY AND ENZYME
Richard G. Shaler, Greenbrae, and Raymond L. McAdam, San Francisco, Calif., assignors to American Tansul Company, San Francisco, Calif., a corporation of California
No Drawing. Filed July 13, 1959, Ser. No. 826,480
6 Claims. (Cl. 99—52)

This invention relates to an improved brewing process wherein a swelling, gelling clay of the montmorillonite group such as hectorite, and in some cases with the addition of amylolytic, proteolytic and/or pectic enzyme adsorbed on the clay, is added to the wort to improve its qualities and increase stability of the beer end product.

Applicants cross-reference United States Letters Patent No. 2,898,270 filed June 26, 1958 issued August 4, 1959 to Witt and Shaler, said patent being copending herewith.

Hectorite, the clay particularly contemplated in conjunction with this process, is a magnesium-lithium-bentonite, which occurs naturally in the vicinity of Hector, San Bernardino County, California.

The constituents of beer, both desirable and undesirable, have their source in the raw materials and in the progressive processing of the raw materials. The brewing process consists essentially of slurrying the grain materials in water under controlled heat conditions with the natural amylolytic and proteolytic enzymes converting the starch contained therein to sugars and modifying the protein constituents. The resulting liquor is elevated in temperature to halt enzymatic action and then is filtered through a bed consisting of the contained grain husks with repeated washing or sparging to leach the remaining soluble products. The filtered wort is then brought to boiling temperature with the addition of hops to extract the flavor component of the hops and to cause a protein denaturation called the hot break. The insoluble hop constituents are then strained from the wort and the liquor cooled, causing further protein denaturation called the cold break. Yeast is then added to the wort and conversion of the sugars to alcohol and carbon dioxide begins.

It has been determined that where an expanding lattice type clay of the montmorillonite group, specifically hectorite, and in some cases with the addition of amylolytic, proteolytic and/or pectic enzyme adsorbed on the clay, is added to the wort, the undesirable protein components modified during processing are adsorbed and rendered insoluble, the yield of dextrins, sugars and extract from the grains is improved, and the flavor characteristics of the beer end product produced from the wort so treated are more uniform and less susceptible to change.

In accordance with the present invention an expanding lattice type clay either alone or with amylolytic, proteolytic and/or pectic enzyme activity adsorbed on the surface of the clay, may be added to the water prior to the addition of the grain, the correct amount of clay added all to the mash tun or proportionate amounts added both to the mash tun or to the cooker after the grain has been added, but before the temperature is increased above about 165° F. to inactivate the enzyme. Some of the added clay will pass through the grain bed in the filtering operation into the boiling process and enhance the hot and cold breaks and will aid in limiting the harsh characteristics of the hops. Alternatively, an expanding lattice type clay, but without enzymatic activity, may be added directly to the boiling operation, i.e., kettle or hot wort, without having been added to the mashing operation. When the clay is allowed to function in the boiling operation, a cleaner yeast will be harvested after fermentation due to the elimination of the harsh hop protein-tannin complex, but since the clay is not added until after the mash is prepared, there is no evidence of increased extract or speed of filtration. The flavor characteristics of the beer produced from wort treated in the kettle are more uniform and less susceptible to oxidative change, less harsh in character, and the yeast harvested after fermentation much cleaner.

One object of the present invention is to treat the wort whereby undesirable protein components modified during processing are adsorbed and rendered insoluble.

Another object of the present invention, where the enzyme and/or clay is dispersed in the water in which the grains are slurried, is to increase the yield of dextrins, sugars, and extract from the grains and improve the rate of filtration through the grain beds.

Another object is to improve the flavor characteristics of the beer end product derived from wort treated according to the present invention whereby the flavor is more uniform and less susceptible to change.

Another object is to eliminate harsh hop protein-tannin complexes whereby a cleaner yeast is harvested subsequent to fermentation.

The invention will be described with reference to specific experiments wherein hectorite has been added in the range of from .05 to .25% of the weight of grains, alone or with an enzyme activity adsorbed on the surface of the clay, has been added to the water either prior to the addition of grain or to the mash tun in the cooker after the grain has been added but before the temperature is increased above 165° F. Hectorite in the amount of about 2 to 10 pounds per 100 barrels, but without enzymatic activity, may also be added directly to the boiling operation.

EXPERIMENTAL DATA ON THE ADDITION OF HECTORITE TO WORT

*Experiment 1* a. .05 pound hectorite was added to 9 gallons of water (23 grams of hectorite slurried in 500 milliliters of water and added to the mash water which was at 110° F.).

b. 34½ pounds of ground malt was added to the 9 gallons of water.

c. The temperature of the mash was increased from 110° F. to 163° F. and held at that temperature for 45 minutes.

d. Four gallons of water, mixed with four pounds of ground malt and 12½ pounds of refined corn grits, which had been previously raised in temperature from 110° F. to 212° F. over a period of 25 minutes and then held at 212° F. for 10 minutes, was added to the main mash which was then at 163° F.

e. The main mash, after the addition of the cooker mash and after the 45 minute holding time at 163° F. was raised to 167° F. and held there for 15 minutes after which it was transferred to the lautering operation (filtering of grain remanents from the liquor).

f. The wort was filtered through the grain bed and then sparged (sprayed and leached) with 23 gallons of water which was at 167° F.

g. The wort was transferred to the kettle after the lautering operation and 1.3 pounds of hops added after two hours of boiling and then the wort with the hops were boiled for 30 minutes.

h. After the 30 minute boiling, the hops were strained from the wort and the wort was cooled to 50° F. after which time yeast was added.

*Experiment 2*

Hectorite in the amount of 0.1% of the total weight of grain was added together with 50 activity units of bromelin in 500 milliliters of water.

a. .05 pound of hectorite, plus 50 activity units of bromelin were added to 9 gallons of water (23 grams of hectorite plus 50 activity units of bromelin in 500 milliliters of water added to the mash which was at 110° F.).

b. 34½ pounds of ground malt was added to the main mash.

c. The temperature of the main mash was increased to 163° F. and held for 45 minutes.

d. Four gallons of water, slurried with four pounds of ground malt and 12½ pounds of refined corn grits, which had previously been raised from 110° F. to 212° F. and held ten minutes at 212° F., was added to the main mash which was then at 163° F.

e. The main mash, after the cooker mash had been added and after the 45 minute holding time, was raised to 167° F. and held for 15 minutes after which it was transferred to lautering (filtering of grain remanents from the liquor).

f. The wort was filtered and then sparged (sprayed and leached) with 23 gallons of water which was at 167° F.

g. The wort was transferred to the kettle where 1.3 pounds of hops was added after two hours of boiling and then the hops and wort were boiled for an additional 30 minutes.

h. After the 30 minute boiling time the hops were strained from the wort and the wort cooled to 50° F. after which time yeast was added.

Experiment 3

Hectorite in the amount of 0.1% of the total weight of grain was added with an amylolytic enzyme (alpha amylase) in the amount of 0.1% of the weight of hectorite.

a. .05 pound of hectorite, plus .00005 pound of alpha amylase were added to 9 gallons of water (23 grams of hectorite plus .023 gram of alpha amylase in 500 milliliters of water was added to the 9 gallons of water at 110° F.).

b. 34½ pounds of ground malt was added.

c. The temperature of the mash was increased from 110° F. to 163° F. and held for 45 minutes.

d. Four gallons of water, slurried with four pounds of ground malt and 12½ pounds of refined corn grits which had been previously raised from 110° F. to 212° F. and held 10 minutes at 212° F., was added to the main mash which was then at 163° F.

e. The main mash, after the addition of the cooker mash, was raised to 167° F. and held for 15 minutes, after which it was transferred to lautering (filtering of grain remanents from liquor).

f. The wort was filtered and then sparged (sprayed and leached) with 23 gallons of water which was at 167° F.

g. The wort was transferred to the kettle where 1.3 pounds of hops was added after two hours of boiling and the wort and hops were boiled an additional 30 minutes.

h. After the wort and hops had been boiled for 30 minutes the hops were strained from the wort and the wort cooled to 50° F. after which time yeast was added.

Experiment 4

Hectorite in the amount of 0.1% of the total weight of grain was added and 0.1% of the weight of hectorite as pectic enzyme was added to the malt mash.

a. .05 pound of hectorite, plus .00005 pound of pectic enzyme (Pektizyme) were added to 9 gallons of water (23 grams of hectorite plus .023 gram of Pektizyme in 500 milliliters of water).

b. 34½ pounds of ground malt was added.

c. Temperature increased from 110° F. to 163° F. and held at that temperature for 45 minutes.

d. Four gallons of water, mixed with four pounds of ground malt and 12½ pounds of refined corn grits, which had been previously raised in temperature from 110° F. to 212° F. over a period of 25 minutes and then held at 212° F. for 10 minutes, was added to the main mash which was then at 163° F.

e. The main mash, after the addition of the cooker mash and after a 45 minute holding time at 163° F. and held there for 15 minutes after which it was transferred to the lautering operation (filtering of grain remanents from the liquor).

f. The wort was filtered through the grain bed and then sparged (sprayed and leached) with 23 gallons of water which was at 167° F.

g. The wort was transferred to the kettle after the lautering operation and 1.3 pounds of hops added after two hours of boiling and then the wort with the hops were boiled for 30 minutes.

h. After the 30 minute boiling the hops were strained from the wort and the wort cooled to 50° F. after which time yeast was added.

Experiment 5

Wherein hectorite as 0.1% of the total weight of grains was added to both the malt mash and the cooker mash.

a. .035 pound of hectorite added to 9 gallons of water at 110° F. (16 grams of hectorite in 350 milliliters of water).

b. 34½ pounds of ground malt was added.

c. The temperature was increased to 163° F. and held for 45 minutes.

d. .015 pound of hectorite was added to four gallons of water at 110° F. (7 grams of hectorite in 150 milliliters of water).

e. Four pounds of ground malt and 12½ pounds refined corn grits were added to the four gallons of water and 7 grams of hectorite.

f. The cooker mash was raised from 110° F. to 212° F. in 25 minutes and held 10 minutes at 212° F. and then added to the main mash which was at 163° F.

g. The main mash, after the addition of the treated cooker mash, was raised to 167° F. and held 15 minutes after which it was transferred to lautering (filtering of grain remanents from liquor).

h. The wort was filtered and spraged (sprayed and leached) with 23 gallons of water which was at 167° F.

i. The wort was transferred to the kettle and 1.3 pounds of hops were added after two hours of boiling and boiled an additional 30 minutes.

j. After the wort and hops had been boiled 30 minutes the hops were strained from the wort and the wort cooled to 50° F. after which time yeast was added.

Experiment 6

Wherein hectorite and proteolytic enzyme were added to the malt mash and hectorite alone to the cooker mash.

a. .035 pound hectorite plus 50 activity units of bromelin added to 9 gallons of water at 110° F. (16 grams hectorite plus 50 activity units bromelin in 350 milliliters of water).

b. 34½ pounds ground malt was added.

c. The temperature of the mash was increased to 163° F. and held for 45 minutes.

d. .015 pound of hectorite was added to four gallons of water at 110° F. (7 grams of hectorite in 150 milliliters of water).

e. Four pounds ground malt plus 12½ pounds refined corn grits were added to the four gallons.

f. Four gallons was raised from 110° F. to 212° F. within 25 minutes and held 10 minutes at 212° F. then added to the main mash which was then at 163° F.

g. The main mash was raised to 167° F. and held for 15 minutes after which it was transferred to lautering (filtering of grain remanents from liquor).

h. The wort was filtered and sparged (sprayed and leached) with 23 gallons of water which was at 167° F.

i. The wort was transferred to the kettle where 1.3 pounds of hops was added after two hours of boiling and held for an additional 30 minutes.

j. After the wort and hops had been boiled for an additional 30 minutes the hops were strained from the wort. The wort was cooled to 50° F. and then yeast was added.

Experiment 7

Wherein hectorite plus amylolytic enzyme (alpha amylase) were added to the malt mash and hectorite alone to the cooker mash.

a. .035 pound of hectorite plus .00005 pound of alpha amylase were added to 9 gallons of water at 110° F. (16 grams hectorite plus .023 gram of alpha amylase in 350 milliliters of water).

b. 34½ pounds ground malt was added.

c. The temperature was increased to 163° F. and held for 45 minutes.

d. .015 pound of hectorite was added to four gallons of water at 110° F. (7 grams of hectorite in 150 milliliters of water).

e. Four pounds ground malt and 12½ pounds refined corn grits were added to the four gallons.

f. Four gallons were raised from 110° F. to 212° F. in 25 minutes and held for 10 minutes at 212° F. then were added to the main mash which was at 163° F.

g. The main mash was raised to 167° F. and held for 15 minutes then transferred to lautering (filtering of grain remanents from liquor).

h. The wort was filtered and sparged (sprayed and leached) with 23 gallons of water which was at 167° F.

i. The wort was transferred to the kettle and 1.3 pounds of hops added after two hours of boiling and boiled for an additional 30 minutes.

j. After the wort and hops had been boiled for an additional 30 minutes the hops were strained from the wort and the wort cooled to 50° F. after which time yeast was added.

*Experiment 8*

Wherein hectorite and pectic enzyme were added to the malt mash and hectorite alone to the cooker mash.

a. .035 pound of hectorite, plus .00005 pound of pectic enzyme (Pektizyme) were added to 9 gallons of water at 110° F. (16 grams of hectorite plus .023 gram of Pektizyme in 350 milliliters of water).

b. 34½ pounds ground malt was added.

c. The temperature was increased to 163° F. and held for 45 minutes.

d. .015 pound hectorite was added to four gallons of water at 110° F. (7 grams in 150 milliliters of water).

e. Four pounds ground malt and 12½ pounds of refined corn grits were added to the four gallons.

f. Four gallons were raised from 110° F. to 212° F. in 25 minutes and held for 10 minutes at 212° F. then were added to the main mash which was then at 163° F.

g. The main mash was raised to 167° F., held for 15 minutes and then transferred to lautering (filtering of grain remanents from liquor).

h. The wort was filtered and sparged (sprayed and leached) with 23 gallons of water which was at 167° F.

i. The wort was transferred to the kettle where 1.3 pounds of hops were added after two hours of boiling and the wort with the hops boiled an additional 30 minutes.

j. After the wort and hops were boiled an additional 30 minutes the hops were strained from the wort and the wort cooled to 50° F. after which time yeast was added.

*Experiment 9*

Wherein hectorite was added to the kettle.

a. 34½ pounds of ground malt was added to 9 gallons of water at 110° F.

b. The temperature was increased to 163° F. and held for 45 minutes.

c. Four gallons of water, slurried with four pounds of ground malt and 12½ pounds refined grits which had been previously raised from 110° F. to 212° F. and held for 10 minutes at 212° F., was added to the main mash which was then at 163° F.

d. The main mash, plus the cooker mash, was then raised to 167° F., held for 15 minutes and then transferred to lautering (filtering of grain remanents from liquor).

e. The wort was filtered and then sparged (sprayed and leached) with 23 gallons of water which was at 167° F.

f. The wort was transferred to the kettle and .05 pound of hectorite slurried in 500 milliliters of water (23 grams of hectorite in 500 milliliters of water) was added to the wort in the kettle.

g. 1.3 pounds of hops was added to the wort in the kettle after two hours of boiling and the wort and hops were boiled for an additional 30 minutes.

h. After the wort and hops had been boiled an additional 30 minutes the hops were strained from the wort and the wort cooled to 50° F. after which time yeast was added.

RESULTS

All beers produced from the above experiments had less harsh flavor characteristics; the flavor appeared to be more uniform and was less susceptible to oxidative changes; the yield of the dextrines, sugars and extracts from the grains was improved and the filtering rate through the grain bed was increased.

Both the hot and cold breaks were enhanced and a cleaner yeast was harvested after fermentation. On Experiment 9, since the hectorite was not added until after the mash had been prepared, there was no evidence of increased extract and also, since the clay was not in at the time of filtering, it did not increase filter speed. However, the flavor characteristics of the beer produced from the wort treated in the kettle were more uniform and less susceptible to oxidative change. The flavor also was less harsh in character and the yeast harvested after fermentation was much cleaner.

Although the foregoing invention has geen described in some detail for purposes of clarity and illustration, it will be understood that certain changes and modifications may be made without departing from the spirit of the invention as restricted only by the scope of the appended claims.

What is claimed is:

1. In the brewing art, the improvement which comprises mashing malt that has been treated with a montmorillonite clay to form wort, and thereafter completing the brewing process.

2. In the brewing art, the improvement which comprises mashing malt that has been treated with hectorite to form wort, and thereafter completing the brewing process.

3. An improved method for the production of beer which comprises treating grain with an aqueous dispersion of a montmorillonite clay prior to mashing and wort formation, thereafter forming a wort, and then completing the brewing process.

4. An improved method for the production of beer which comprises treating grain with an aqueous dispersion of hectorite prior to mashing and wort formation, thereafter forming a wort, and then completing the brewing process.

5. An improved method in accordance with claim 4 wherein the grain is treated with hectorite in an amount equal to about .05% to 25% by weight of the grain.

6. A method of treating malt to produce beer including the steps of initially dispersing hectorite in small amounts in an aqueous malt medium prior to raising the temperature of the latter above about 165° F., then forming wort by increasing the temperature of the solution to a point lower than boiling and maintaining the lower than boiling temperature for a dwell period of approximately one hour, and then adding a small additional amount of hectorite.

References Cited in the file of this patent

UNITED STATES PATENTS

| | | |
|---|---|---|
| 2,433,411 | Wallerstein | Dec. 30, 1947 |
| 2,717,852 | Stone | Sept. 13, 1955 |
| 2,898,270 | Witt et al. | Aug. 4, 1959 |